United States Patent [19]

Meldrum

[11] Patent Number: 5,229,152
[45] Date of Patent: Jul. 20, 1993

[54] METHOD FOR EXTENDING PRODUCE SHELF LIFE

[76] Inventor: Charles R. Meldrum, 526 University Pl., Grosse Pointe, Mich. 48230

[21] Appl. No.: 786,709

[22] Filed: Nov. 1, 1991

[51] Int. Cl.⁵ ............................................. A23B 7/00
[52] U.S. Cl. .................................. 426/327; 426/238; 426/310; 426/506; 426/524
[58] Field of Search .............. 426/237, 238, 327, 506, 426/520, 524, 310; 134/1

[56] References Cited

U.S. PATENT DOCUMENTS

| | | | |
|---|---|---|---|
| 3,026,885 | 3/1962 | Eytinge | 426/506 |
| 3,136,642 | 6/1964 | Backinger et al. | 426/237 |
| 3,212,756 | 10/1965 | Hutton | 426/238 |
| 4,461,781 | 7/1984 | Akesson et al. | 426/524 |
| 4,855,153 | 8/1989 | Orr et al. | 426/270 |
| 4,919,948 | 4/1990 | Orr et al. | 426/106 |
| 5,004,863 | 4/1991 | Umbeck | 800/205 |

FOREIGN PATENT DOCUMENTS 2-222671 9/1990 Japan ................ 426/238

OTHER PUBLICATIONS

Leslie Roberts, "Genetic Engineers Build a Better Tomato", *Science*, vol. 241, p. 1290, Sep. 9, 1988.
Graeme Hobson, "How the Tomato Lost Its Taste", *New Scientist*, Sep. 29, 1988, pp. 46-50.
"Tomato Treatment", *New Scientist*, Jun. 24, 1989.
Ellen Creager, "Eating Well", *Detroit Free Press*, Aug. 16, 1985.
"The Case of the Tinkered Tomato: A Taste of Regulations to Come", *New Scientist*, Sep. 9, 1989.
Dermot, O'Sullivan, "Bioengineered Tomatoes Readied for Taste Trials", *C&EN*, Oct. 9, 1989, p. 27.
D. E., "Putting Down Roots", *Scientific American*, May 1990, pp. 81, 84.
Mark Crawford, "Biotech Companies Lobby for Federal Regulation", *Science*, vol. 248, pp. 546-547, May 1990.
Edmund L. Andrews, "Proposals on Genetic Technology", *Business Day, The New York Times*, Feb. 19, 1991, pp. C1-C2.
Biotech Patent News, Aug. 1991, pp. 4-5.
S. R. Drake, et al., "Postharvest Use of Sucrose Polyesters for Extending the Shelf-Life of Stored 'Golden Delicious' Apples", *Journal of Food Science*, vol. 52, No. 5, 1987, pp. 1283-1285.
S. E. Lindow, et al., "The Role of Bacterial Ice Nuclei in Frost Injury to Sensitive Plants", *Academic Press, Inc.*, 1978, pp. 249-263.
C. Orser, et al., "Cloning of Genes Involved in Bacterial Ice Nucleation and Fluorescent Pigment/Siderophore Production", *Molecular Genetics of the Bacteria-Plant Interaction*, 1983, pp. 353-361.

*Primary Examiner*—George Yeung
*Attorney, Agent, or Firm*—Harness, Dickey & Pierce

[57] ABSTRACT

Disclosed is a process for extending the shelf life of produce. First the fruit or vegetable is transferred from the harvesting stage to a wash bath which is maintained at a temperature of approximately 90° F. and vibrated at an ultrasonic frequency to wash the produce. Next, the produce is transferred from the wash bath to a snap freeze slurry which consists of byproducts of the produce along with certain sugars and acids in order to snap freeze the produce for approximately 10 seconds. Next, the produce is transferred to an incubation cell which maintains the produce at a constant temperature within the range of 60°-70° F. for approximately 48 hours in order to dry and crystallize the slurry material on the produce. Using the method of the present invention, the shelf life of the produce can be greatly extended and certain taste and quality values enhanced for many species of produce.

24 Claims, 1 Drawing Sheet

METHOD FOR EXTENDING PRODUCE SHELF LIFE

FIELD OF THE INVENTION

This invention relates generally to a method of prolonging the shelf life of produce, and, more particularly, to a method of prolonging the shelf life of produce by first washing the produce in a heated ultrasonic bath, snap freezing the washed produce in a slurry of natural byproducts, then drying the produce at ambient temperatures.

BACKGROUND OF THE INVENTION

The freshness of produce is typically defined by the qualities of taste, texture and appearance. Due to certain physiological effects fruits and vegetables generally begin to deteriorate and lose their freshness at the time of harvest. Once harvested from the parent plant, the fruit or vegetable no longer has the immune-like system of the plant to combat bacteria, fungus and viruses which deteriorate the produce. A substantial percentage of fruit and vegetable harvests is thus lost due to such deterioration. Because of the immense size of the produce industry, it would be highly advantageous from an economic standpoint to preserve harvested produce in a savory, fresh condition for a longer period of time. Hence, many different methods for prolonging produce shelf life have been employed, with varying degrees of success.

Refrigeration has been the most popular method of increasing the useful life of fresh fruits and vegetables. By storing produce at a low temperature, it is possible to extend the freshness by retarding ripening, softening, textural changes and color changes. Lower temperatures also reduce undesirable metabolic changes, reduce moisture losses, and prevent undesirable growth on the produce. However, depending on the length of time the produce is chilled, refrigeration generally adversely affects taste and quality, and in the case of excessive or extreme chilling, may actually damage the produce due to chilling stresses.

Other methods of prolonging shelf life include coating the fruit or vegetable with a protective material, such as wax. However, the success of the coating is related not only to how well the coating protects the fruit or vegetable, but also how well it maintains a desirable appearance of the fruit or vegetable, without affecting its taste. Consequently, the success of this method has been limited. It has also been attempted to lengthen the shelf life of produce through heating to reduce the microorganism population, then refrigerating it at a desirable temperature. The success of this process has been limited in that shelf life has not been significantly increased. It has also been a common practice to harvest produce prior to ripening, then treating it with ethylene gas to effect ripening. This process has generally provided a low quality, unflavorful product, particularly in the case of tomatoes. Furthermore, the effects of deterioration begin at the time of harvest regardless of ripeness of the fruit or vegetable.

A more recent approach to increasing the shelf life of produce, and tomatoes in particular, has been the employment of genetic engineering techniques to decrease the rate in which tomatoes are affected by microorganisms. Such a process can be viewed as overly complicated to accomplish the goals of extended freshness, and has also enjoyed only limited success.

What is needed is a simple procedure for significantly increasing the shelf life of produce at a reasonable cost. It is therefore an object of the present invention to provide such a procedure.

SUMMARY OF THE INVENTION

Disclosed is a method of increasing the shelf life of fruits and vegetables, hereafter collectively referred to as "produce," comprising the step of "snap freezing" the produce. By "snap freezing" it is meant subjecting the produce to temperatures substantially at or below the freezing point of water for a brief predetermined period of time without the produce flesh being frozen.

A preferred embodiment of this method includes the step of first introducing a fruit or vegetable into a heated bath being vibrated generally at a frequency within the range of subsonic to ultrasonic frequencies for a predetermined time shortly after harvest. Next, the fruit or vegetable is transferred to a nucleation vat containing a natural slurry generally comprising natural material extracts including predetermined concentrations and combinations of byproducts from the fruit or vegetable being processed, low solute concentrations of sucrose sugars, fruit and/or acetic acid, and a water solvent carrier. The slurry is maintained at a temperature below the freezing point of water in order to snap freeze the fruit or vegetable. In accordance with a preferred embodiment of the present invention, the fruit or vegetable is then "snap frozen" by immersing it in the cold slurry for a brief predetermined period of time. Since the fruit or vegetable is held in the nucleation vat for only a brief period of time, the flesh of the fruit or vegetable itself will not actually be frozen. Finally, the fruit or vegetable is transferred from the nucleation vat to an incubation chamber and held there for a predetermined time, generally at ambient temperatures. The incubation stage is used to stabilize and dry the fruit or vegetable in order to fully crystallize a film of the slurry on the outer surface of the fruit or vegetable. The produce can then be stored or displayed for extended periods of time without significant deterioration or loss of taste, texture and appearance, without the need for refrigeration.

Other features and advantages of the present invention will be become apparent from the following description and appended claims, taken in conjunction with the accompanying FIGURE.

BRIEF DESCRIPTION OF THE FIGURE

The FIGURE is a flow chart block diagram of the produce shelf life extension process according to one preferred embodiment of the present invention.

DETAILED DESCRIPTION OF THE PREFERRED EMBODIMENTS

Figure 1:
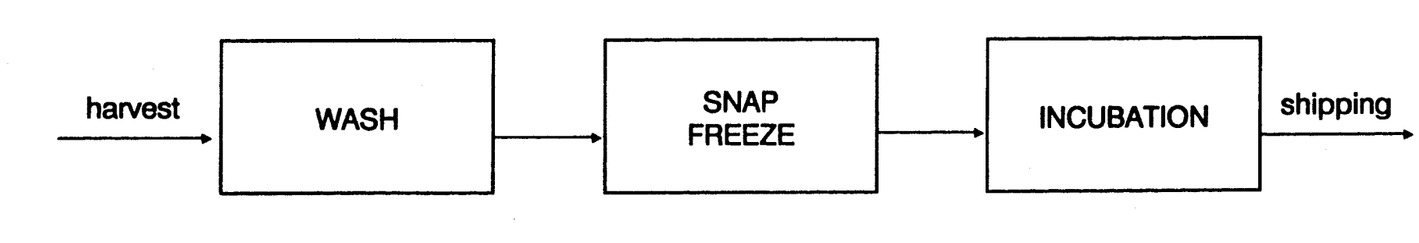

The following description of the preferred embodiment of extending the shelf life of produce is merely exemplary in nature and is in no way intended to limit the scope of the invention or its application or uses.

Disclosed below is a process for preserving the shelf life of produce which includes as an important step, a procedure of nucleation or the microscopic formation of natural ice crystals in the micron range on the outer surface of the fruit or vegetable. Although this process will be discussed with particular reference to tomatoes primarily due to the formidable challenges of extending their limited shelf life, it will be understood that this process is also applicable to other fruits and vegetables including, but not limited to, strawberries, bananas and cantaloupes.

The FIGURE is a block diagram flow chart showing the different stages of the shelf life extension process according to one preferred embodiment. The layout and equipment used is not a vital concern to the discussion of the process itself. It is proposed, however, that the equipment required to perform the immediate steps after harvest of this process be included as a single system. In this manner, each of the steps of the process may be performed at one harvest site and subsequently the system moved to another harvest site.

Returning to the Figure, harvested tomatoes typically, after being sorted, are first introduced into a heated preconditioning or wash bath represented by the first box. The tomatoes are generally introduced into the wash bath immediately after their harvest to minimize the effects of microorganisms on the ripening fruit. The equipment for performing the step of washing the tomatoes generally includes a series of conveyor fed tanks which are filled with water in which the water is maintained at a temperature of approximately 90° F., in one preferred embodiment, to impart a uniform heat or enthalpy to the individual mass or piece. The exact temperature is not crucial so long as the wash bath is heated. It will of course be appreciated that excessive heating will damage the produce. The tomatoes are preferably continuously being moved through the wash tanks at a rate such that the produce is in the wash bath for a brief period of time, generally within a range of about 5 seconds to about 30 seconds. This time frame is by way of example as other times may also be applicable. The tomatoes are then moved from the wash tanks and generally set on a conveyor to be transported to the next step.

In addition to the wash bath being maintained at an elevated temperature, the wash bath is subjected to ultrasonic sound waves to promote the cleaning of the tomatoes. In some applications sub-sonic frequencies will also be applicable. It is believed that the combination of elevated temperature and ultrasonic vibration makes active and exposes the different microorganisms which may exist on the tomato. The vibrating bath further removes dirt which may be clinging to the fruit. The desirable frequency of the ultrasonic waves vibrating the wash bath is within the range of about 20 to about 2000 KHz to provide the necessary harmonics to allow the cleansing. By enabling the ultrasonic vibration of the wash bath to be variable, it is possible to activate a wide range of different microorganisms which may occur on a single type of fruit or vegetable, or on different types of fruits and vegetables, thus extending the process to other types of fruits and vegetables besides tomatoes. The temperature of the wash bath, as well as the ultrasonic vibration frequency, are generally monitored and controlled by some applicable process.

The next step involves a "snap freeze" nucleation step represented by the second box in the Figure. The "snap freeze" step, as defined in this embodiment, generally utilizes a series of tanks filled and maintained with a natural or non-artificial slurry held at a temperature below the freezing point of water in order to cool or chill the fruit. In one preferred embodiment, the natural slurry for snap freezing the tomatoes includes byproducts of tomatoes, low solute concentrations of sucrose, sugars, fruit and/or acetic acids and a water solvent carrier. Different predetermined combinations and concentrations of these and other products can form the slurry with the emphasis on the slurry being formed from natural ingredients. Those skilled in the art can determine appropriate combinations and concentrations of the slurry. It has been found that the better results are achieved if the slurry does indeed include byproducts of the fruit or vegetable, or byproducts from those fruits of a related species being processed. Therefore, for produce other than tomatoes, the applicable byproduct would be from that produce or similar hybrid form. In addition, it has been found desirable to maintain the slurry at a temperature within the range of about 27° F. to about 32° F., however, other temperatures may be applicable. This range offers effective freezing temperatures without being excessively low, thus reducing chill stresses. Consequently, the tomatoes moved through the wash bath are immediately transferred at this elevated temperature to the snap freeze tanks to be quickly reduced to a temperature of approximately 28° F. The tomatoes are maintained in the snap freeze slurry for a brief period of time, generally from about 10 seconds to about 15 seconds. In the snap freeze step, the tomatoes themselves are not frozen but are coated with a layer of frozen slurry material. Therefore, any chill damage to the tomatoes is significantly reduced or eliminated. It is stressed that the combination of other exposure times and slurry temperatures may be applicable to achieve the desired results.

The final step in this shelf life extension process includes transferring the tomatoes immediately from the snap freeze tanks to a storage or incubation chamber as represented by the last box of the Figure. The incubation chamber stabilizes and dries the tomatoes forming a crystalline film of the slurry on the outer surface of the tomato. In this manner the slurry is maintained within the pores on the outer surface of the tomatoes. It has been found effective to maintain the tomatoes at a substantially constant temperature within an approximate range of about 60° F. to about 70° F. for a time of about 48 hours. However, other storage temperatures and drying times, from a few minutes to a few hours, could be equally effective. Typically, the incubation chamber will be held in an ambient environment, i.e., normal humidity, pressure, natural air composition, etc. After this incubation time the tomatoes are fully dried and crystallized with a thin film of the slurry on their outer surface and ready for shipping. For long term shipping, special carrier units can be used to minimize the adverse effects of weather on the tomatoes. By the process discussed above, the shelf life of tomatoes, as well as other fruits or vegetables, can be extended up to a surprising median shelf life of 10 weeks.

The "snap freeze" procedure provides the most important step in the shelf life extension process discussed above. It is therefore important that the concentration of the slurry and exposure time of the fruit in the slurry be accurately controlled. In this step the outer volumetric size of the tomato which has been increased in the hot bath is decreased in the cold slurry and nucleation crystals of the slurry are formed within the pores on the outer surface of the tomatoes which it is believed, in turn, tends to drive out microorganisms which contribute to the deterioration of the tomato. From microscopic investigation in the aging cycle of the fruit, it is believed that micron pore geometries and dynamics alter the penetration of bacteria, fungi and pathogens.

The nucleation crystals disrupt the life-cycle of fungi and bacterial spores responsible for accelerated aging of the fruit. In other words, the fruits immune-like structure changes along with the lipid, stoma activity, gas exchange and glucose levels within the fruit in such a manner that the bacterial, fungal and viral activity on the fruit is affected such that the natural aging process is significantly reduced.

SPECIFIC EXAMPLES

The following Specific Examples are shown to illustrate the parameters and effect of the above described procedure which have drastically increased the shelf life of tomatoes as well as other produce. These examples are by no means limiting in that other parameters would be required for other fruits or vegetables. It is noted that the first nine Specific Examples are for tomatoes and the last three Specific Examples are labelled accordingly.

EXAMPLE I

SUBJECT:
VALUE, LIFE, QUALITY (VLQ) TEMPERATURE SHOCK: WATER ONLY
SUMMARY:
Ran 12 samples at 90°-94° F. for 1 minute soak and stabilize. Allowed soak time to be 30 seconds, then 1 minute (6 samples each). Ran culture check on water in both baths. Temperature was held just above freezing. Trial sample check of temperature change had some effect, however minimal.
RESULTS:
Shelf samples lasted 2-3 weeks. Gradual then accelerated rotting. Overall results inconclusive.
LAB METHOD:
1. Set up Tank 1 to 30 liter capacity and filled with tap water. Set a heat source rheostat to stabilize the Tank 1 wash bath at 90° F.
2. Set up Tank 2 to 30 liter capacity and filled with tap water. Set refrigeration coils to stabilize the Tank 2 water bath temperature at 33° F.
3. Selected 12 tomato samples of approximately 2.5-3 inches in diameter—(½ lbs.-200-300 grams per tomato). Took samples from approx. 80° F. vine temperature, blush/red in color.
PART A (6 SAMPLES)
4. Immediately after picking two samples, placed same in Tank 1 for 30 seconds soak time.
5. Removed the samples from Tank 1 and immediately immersed them into Tank 2 for 30 seconds.
6. Removed the samples from Tank 2 and placed them on a drain tray inside an incubation drying chamber. Did not touch for 48 hours.
7. Repeated steps 4 through 6 to complete six total samples A30 having nucleation in Tank 2 for 30 seconds. Again, did not move samples or drying tray from original position.
8. Collected several drops of solution from below drain tray and ran smear agar cultures for back count.
PART B (6 SAMPLES)
9. Repeated procedure 4 through 8 to produce sample A60 with the following exception: Each pair of samples was immersed in Tank 2 for a period of 60 seconds.
10. After 48 hour stabilizing time moved samples A30, A60 and placed them in a lab storage rack for observation and VLQ evaluation. Made daily visual checks, but did not handle samples.
11. Picked 4 bench samples from parent plants at same color maturity level as the samples. These were placed adjacent to processed samples.
12. Cleaned and dried Tanks 1 and 2. Sterilized in an oven at 300° F. Refilled Tanks with charcoal filtered tap water.
13. Repeated steps 4 through 10 to produce final samples of B30, B60. Note only eight tomatoes were available.
14. Made visual observation and microscopic tissue checks once samples were taken out of the storage rack.
15. Completed lab sheet test matrix.
DATA/ANALYSIS:

| Sample Count at Week No. | Test Mode A and B, Time 30, 60 Second | | | |
|---|---|---|---|---|
| | A30 | A60 | B30 | B60 |
| 1 | 6 | 6 | 4 | 4 |
| 2 | 5 | 6 | 3 | 4 |
| 3 | 2(X) | 3 | 0 | 3 |
| 4 | 0 | 1 | 0 | 0 |
| 5 | 0 | 0 | 0 | 0 |

A. Not Filtered
B. Filtered
Bench samples no good after 8 days.

EXAMPLE II

SUBJECT:
VLQ TEMPERATURE SHOCK: WATER ONLY
SUMMARY:
Ran 12 samples at 90°-94° F. for 1 minute, soak and stabilize. Allowed soak time to be 30 seconds, then 1 minute (6 samples each). Ran culture check on water in both baths. Temperature was held just above freezing. Trial sample check on temperature change had some effect, however minimal. Repeat of Example I for verification purposes.
RESULTS:
Shelf samples lasted 2-3 weeks. Gradual then accelerated rotting. Repeat of prior test.
LAB METHOD:
This example had the same method as Example I and was conducted just for verification purposes only on the use of water alone. It is believed that it was well water from another source.
DATA ANALYSIS:

| Sample Count at Week No. | Test Mode A and B, Time 30, 60 Second | | | |
|---|---|---|---|---|
| | A30 | A60 | B30 | B60 |
| 1 | 5 | 6 | 6 | 5 |
| 2 | 5 | 6 | 3 | 3 |
| 3 | 3 | 2 | 3 | 3 |
| 4 | 0 | 0 | 3(X) | 1 |
| 5 | 0 | 0 | 0 | 0 |

A. Not Filtered
B. Filtered
Bench samples no good after 6 days.

EXAMPLE III

SUBJECT:
SUCROSE VLQ PRELIMINARY TEST
SUMMARY:
Set slurry solution at 200 g/liter. Used glucose from concentrate: 10, 50, 100 ml/liter of solute. Soak time and temperature remained constant at 1.0 minute, 29° F.

Ran 6 samples each. Checked scanning electron microscope (SEM) migration. Altered sucrose concentration and exchange at cell level. Checked glucose/fructose effects on crystalline formation.

RESULTS: Crystallization seems unaffected by sugar concentrations.

LAB METHOD:
1. Set up Tank 1 to 5 liter capacity and filled with water. Maintained temperature at 90° F. for wash of samples.
2. Set up Tank 2 to 5 liter capacity. Prepared glucose solute to allow filling of Tank 2 with product sample.
3. Prepared solute as follows: Group Test A at 200 g/liter of sucrose in filtered water.
4. Mixed slurry with following concentrations:
   (A1) 10 ml/liter of solute = 50 ml slurry bath
   (A2) 50 ml/liter of solute = 250 ml slurry bath
   (A3) 100 ml/liter of solute = 500 ml slurry bath
5. Filled Tank 2 to capacity and maintained temperature as close to 29° F. as possible. Ran A1 test first.
6. Selected six sample tomatoes (200/300 g). Prewashed at 90° F. immediately after harvest from vine. Washed for one minute.
7. Immersed samples in A1 test solution for 1 minute and moved to a drying rack in the incubation chamber.
8. Allowed untouched curing for a period of 48 hours.
9. Repeated steps 6, 7 and 8 for A2 test sequence.
10. Repeated steps 6, 7 and 8 for A3 test sequence.
11. Collected solute concentration drops from a tray in the agar dish to check culture growth.
12. Used a scanning and optical microscope to check crystalline formation and exposure of surface pores.

DATA/ANALYSIS:

| Sample Count at Week No. | Glucose Concentration ml/liter | | |
|---|---|---|---|
| | 10 | 50 | 100 |
| 2 | 6 | 6 | 6 |
| 4 | 6 | 6 | 6 |
| 6 | 4 | 5 | 6 |
| 8 | 3 | 5 | 6 |
| 10 | 3 | 5 | 6 |

EXAMPLE IV

SUBJECT:
SOAK TIME VARIABLE VLQ TEST
SUMMARY:
Stabilized samples in 90° F. bath. Ran samples through bath with accurate time measure. Used 10 samples for each time interval. Checked dry time and shelf store. Sample endurance at concentration of 400 g/liter. Altered soak time cycle from 30 Sec. for 1 minute, 2 minutes, 4 minutes.

RESULTS:
Increased soak time improves shelf life, but may have affected production rate and equipment sizing.

LAB METHOD:
1. Set up Tank 1 to 20 liter capacity of water and maintained the water temperature at 90° F. The tank also included an ultrasonic probe.
2. Set up Tank 2 to 20 liter capacity of filtered water and slurry to be maintained at 29° F. Slurry concentration was as follows: pulp and juice extract from HB-1/32 tomatoes; pasteurized 220° F., 30 minutes, 150 g/liter; acetic acid: wine vinegar, 30 g/liter; fruit acid: lemon or equivalent, 60 g/liter; sucrose: natural sugar forms, 60 g/liter; total slurry solution concentrate, 30 g/liter; total water based solvent, 700 g/liter; and total solution (approximately), 1,000 g (1.0 liter).
3. Prepared solute formulation for 15 liters of slurry to allow volumetric space for ten samples to be run at one time.
4. Total bath slurry concentration (260 g/liter) (15 liters) = 3900 grams of solution.
5. Ran sequence of four tests (A1-A4) to evaluate soak time effect on VLQ for each of ten samples.
   A1 Test: Soak time of 30 seconds
   A2 Test: Soak time for 1 minutes
   A3 Test: Soak time of 2 minutes
   A4 Test: Soak time of 4 minutes
6. Removed ten samples from A1—30 second test and placed on drying racks. Allowed bath temperature to stabilize.
7. Repeated for each of ten samples in bath for A2, A3 and A4 time intervals.
8. Observed daily and ran microscopic checks as required.

DATA/ANALYSIS:

| Sample Count at Week No. | Soak at Time Interval | | | |
|---|---|---|---|---|
| | 30 sec | 1 | 2 | 4 |
| 1-6 | 10 | 9 | 10 | 10 |
| 8 | 9 | 8 | 10 | 10 |
| 10 | 7 | 8 | 10 | 9 |
| 12 | 6 | 8 | 9 | 9 |
| 14 | 6 | 7 | 7 | 9 |
| 16 | 4 | 6 | 7 | 9 |
| 18 | 2 | 4 | 6 | 8 |
| 20 | 0 | 1 | 4 | 8 |

EXAMPLE V

SUBJECT:
PH SHIFT VLQ TEST
SUMMARY:
Held concentration of extract to 200 g/liter. Used acetic acid (vinegar) to bring slurry to pH of 6.5, 6.0, 5.0. Allowed soak time of 1 minute. Ran 6 samples. Taste and endurance on samples with pH shift taken into acidic range of 5-7. Checked for various fruit acids (i.e. lemon) and positive/alkaline shift to alter bacterial count. Set agar culture.

RESULTS:
Acidic shift of 5.0-6.5 at 200 g/liter. Slurry seemed to improve shelf life, but caused poor taste. Skin texture also was affected. Unidentified growth appeared on one sample.

LAB METHOD:
1. Set up Tank 1 to 10 liter capacity with water, and inserted an ultrasonic cleaning head in the tank.
2. Set up Tank 2 to 10 liter capacity with filtered water and slurry solution.
3. Prepared slurry solution from Example IV with following adjusted pH acid concentrations.
4. Used acetic acid to bring pH down to following values. Checked with meter and litmus.
   A1: Solute pH 6.5-mixed into slurry.
   A2: Solute pH 6.0-mixed into slurry.
   A3: Solute pH 5.0-mixed into slurry.
5. Mixed slurry to approximately 9 liters.
6. Picked, washed and immersed six samples into slurry and soaked for 1 minute using A1 solute concentration of 6.5.

7. Removed the samples and allowed drying/curing time of 48 hours.
8. Remixed bath and repeated steps 5, 6 and 7 with additional samples for each solute concentration.
9. Observed daily and ran microscopic checks as required. Set up computer VLQ matrix and completed lab sheets.

DATA/ANALYSIS:

| Sample Count at Week No. | PH Level | | |
|---|---|---|---|
| | 6.5 | 6.0 | 5.0 |
| 1-8 | 6 | 6 | 5 |
| 10 | 6 | 6 | 5 |
| 12 | 6 | 6 | 5 |
| 14 | 5 | 6 | 5 |
| 16 | 4 | 6 | 4 |
| 18 | 3 | 0 | 0 |
| 20 | 0 | 0 | 0 |

EXAMPLE VI

SUBJECT:
WASH TEST-PRECONDITIONING
SUMMARY:
10 samples: Set wash cycle (90° F.) with following series check: (1) water only; (2) mild wash solute; (3) ultrasonic and (4) harmonic determination for frequency, amplitude and time. Selected optimal parameters affected by size and variety. Micro-abrasion preliminary wash test for microorganism expulsion from surface tissue.

RESULTS:
1000-1200 cps appeared to dislodge large amounts of surface bacteria and microorganisms. Some tissue seemed disrupted.

LAB METHOD:
1. Set up Tank 1 to 10 liter capacity with water and placed an ultrasonic cleaning head in the tank. Filled to allow volumetric space to simultaneously run 10 samples in bath.
2. Set an oscillator to deliver a set frequency from 1000 to approximately 1200 cps. Maintained temperature at 90° F.
3. Ran 10 samples through the bath with water alone.
4. Removed the samples after one minute soak time and placed them in the drying racks.
5. Ran 10 samples through the bath at 90° F. for one minute. Used five grams of FDA food wash detergent.
6. Removed the samples after one minute and placed in the drying racks.
7. Ran 10 samples with 5 grams of detergent in the bath and ultrasonic pulse set at 1200 cps.
8. Removed the samples after one minute and placed them in the drying racks.
9. Ran 10 samples with 5 grams of detergent in the bath with ultrasonic pulse set at approximate harmonic frequency of samples. This frequency is subjectively determined by touch and believed to be below the 1200 cps level.
10. Removed the samples after one minute and placed them in the drying racks for observation.
11. Completed lab sheet VLQ data matrix.

DATA/ANALYSIS:
(A) Culture count very high with (2) and 1200+cps. Used one species only. -(4) well over 1200. (B) data matrix.

| Sample Count at Week No. | Sample Batch Number | | | |
|---|---|---|---|---|
| | (1) | (2) | (3) | (4) |
| 2 | 6 | 8 | 10 | 10 |
| 4 | 5 | 7 | 10 | 9 |
| 6 | 5 | 6 | 10 | 9 |
| 8 | 5 | 4 | 8 | 7 |
| 10 | 4 | 4 | 8 | 6 |
| 12 | Stop | Stop | Stop | Stop |

EXAMPLE VII

SUBJECT:
CONCENTRATION SHIFT VLQ TEST
SUMMARY:
Stabilized with 90° F. bath. Ran 12 sample batch. Soak time 30 sec. Checked dry time to 48 hours. Approximately 5 gallon batch (3.8 liter/gal.). Ran bench 6 samples. (No treatment). Sample endurance at different concentrations of solute: 100, 200, 300, 400 g/liter. Fixed temperature range. Slurry concentrates, (H+), acidic sucrose, ran pH check solute mix of 100, 200, 300, 400 g/liter.

RESULTS:
Shelf samples OK after 8-10 weeks. Some deterioration spotting at 11 weeks. Lost 3 samples. 16-18 weeks solid, color and taste acceptable on remaining 15 samples.

LAB METHOD:
1. Set up Tank 1 to 20 liter capacity, filled with water, 5 grams of detergent and inserted the ultrasonic probe set at 1200 cps.
2. Set up Tank 2 to 20 liter capacity, filled with variable solute concentrations per following instructions and maintained the slurry (see Example IV) temperature at approximately 29° F.
3. Organized 4 test series with the slurry solution concentrations and adjusted the slurry according to: (assume 1 g approximates 1 ml).
  A1: 100 g/liter yields 2 liters of solute.
  A2: 200 g/liter yields 4 liters of solute.
  A3: 300 g/liter yields 6 liters of solute.
  A4: 400 g/liter yields 8 liters of solute.
4. For each of the test series A1, A2, A3 and A4, mixed solute in Tank 2 and filled to capacity (approximately 20 liters) and maintained the temperature at near 29° F.
5. Selected, picked and washed 12 samples of mid-ripe tomatoes and allowed a soak time of 30 seconds.
6. Removed the samples and placed them in the drying tray incubation chamber for 48 hours untouched curing period.
7. Repeated test sequence steps 5 and 6 as provided for each concentration.
8. Observed daily and ran microscopic checks as required. Set up computer VLQ matrix and complete lab sheets.

DATA/ANALYSIS:

| Sample Count at Week No. | Sample Count at Concentration | | | |
|---|---|---|---|---|
| | 100 | 200 | 300 | 400 |
| 1-8 | 10 | 11 | 11 | 12 |
| 10 | 10 | 11 | 11 | 12 |
| 12 | 8 | 6 | 10 | 9 |
| 14 | 7 | 4 | 7 | 7 |
| 16 | 6 | 3 | 6 | 6 |
| 18 | 4 | 1 | 6 | 6 |

| Sample Count | Sample Count at Concentration | | | |
|---|---|---|---|---|
| at Week No. | 100 | 200 | 300 | 400 |
| 20 | 2 | 0 | 3 | 4 |

EXAMPLE VIII

SUBJECT:
VARIETY (VLQ) TESTS
SUMMARY:

Used standard wash bath 90° F. for 30 second exposure in 300 g/liter slurry.

Used 10 samples of each species variety Nos. (1),(2),(3),(4).

Series tests on tomato, typical species (Lycopersicon Esculentum) (1) Pear; (2) Superstead Hybrid VRN; (3) Big Girl V.F.; (4) Cherry ... of the 2,750 genetic variations, 30 varieties. NOTE: TLQ rating 0–100% sample number may be followed by "0.85" which defines the decimal equivalent of the TLQ rating at 85% acceptable.

RESULTS:

Preliminary tests indicate the slurry works on all varieties tested. Best Taste/life/quality (TLQ) values seen in the Pear variety.

LAB METHOD:
1. Set up Tank 1 to 20 liter capacity with water. Added 5 grams FDA approved detergent and an ultrasonic probe set at 1200 cps.
2. Set up Tank 2 to 20 liter capacity. Filled with solute concentration at 300 g/liter and maintained the slurry temperature at approximately 29° F.
3. Slurry solution mixed to follow the general batch formulation of: pulp and juice extract from HB-1/32 tomatoes; pasteurized 220° F., 30 minutes, 150 g/liter; acetic acid: wine vinegar, 30 g/liter; fruit acid: lemon or equivalent, 60 g/liter; sucrose: natural sugar forms, 60 g/liter; total slurry solution concentrate, 30 g/liter; total water based solvent, 700 g; and total solution (approximately), 1,000 g (1.0 liter).
4. Selected 10 samples of each of the following brands, picked, washed for 30 seconds and immersed in the slurry for 30 seconds. Removed the samples and placed them on the drying rack for 48 hour curing.
A1—Pear
A2—SH. VRN
A3—Big Girl V.F.
A4—Cherry
5. Observed daily and ran microscopic checks as required. Set up TLQ matrix and completed lab sheets.

DATA/ANALYSIS:

Data matrix not available in complete form due to flood in records storage area. Taste remained excellent.

| Sample Count at Week No. | A(1) | A(2) | A(3) | A(4) |
|---|---|---|---|---|
| 1 | 10 | 10 | 10 | 10 |
| 2 | 10 | 9 | 8 | 10 |
| 3 | 9 | 8 | 6 | 10 |
| 4 | 9 | 6 | 3 | 9 |

General TLQ = 0.92

EXAMPLE IX

SUBJECT:
PROCESS SEQUENCE
SUMMARY:

Set up process sequence-outlined variables and fixed parameters on Lab Test Series A1, A2, A3, A4. Used the samples from each test run. Ran preliminary heat transfer calculation for adiabatic conditions. Examined several parameters during test sequence to search for correlation and economies of scale.

RESULTS:

Sample checks showed several points of correlation between concentration and temperature. This was a trial computer study for Field Test Program, Bradenton, Fla.

LAB METHOD:
1. Prepared generic flow chart for each step in process to identify variables and fixed parameters. Included quantitative results from TLQ observations, microscopic examination of tissue, bacteria culture counts, and appearance of resultant produce relative to time on shelf.

This computer modeling is on-going and is meant to yield the engineering design parameters for production equipment. It also provides basic input data for the "analytical prototype" which is the simulation model to preserve/treat numerous types of fruits, vegetables, herbs, spices and flowers.

DATA/ANALYSIS:

| | Concentration | Time | Temperature | Wash |
|---|---|---|---|---|
| A | Normal 200 | Normal 30, 30 | Normal 90, 29 | Normal 30 |
| B | Normal | 2T | Normal | 0 |
| C | ¼ Conc. | Normal | Normal | Normal |
| D | ¼ Conc. | 2T | Normal | Normal |
| E | Normal | Normal | +10 F | Normal |

EXAMPLE X

SUBJECT:
VLQ TRIAL TEST: MELON
SUMMARY:

Ran 5 samples and one bench. Solute concentration was at 300 g/liter. Ran all samples simultaneous. Sample endurance and taste check with standard concentration and temperature ran six samples.

RESULTS:

Four of the slurry samples lasted five-six weeks. Skin very thin. Skin appears smaller and texture different.

LAB METHOD:
1. Set up Tank 1 to 10 liter capacity, filled with water and added 5 grams of detergent with ultrasonic cleaning probe set to 1200 cps and bath temperature at approximately 90° F.
2. Set up Tank 2 to 10 liter capacity. Filled with 300 g/liter slurry solution (see Example IV) and maintained slurry temperature at 29° F.
3. Selected and picked 6 melons at near ripe state. Immediately washed 5 samples for 30 seconds soak time in 90° F. bath. Used 1 melon as untreated bench sample.
4. Immersed the samples in the slurry at 29° F. for a period of 30 seconds.
5. Removed the samples and placed them in the incubation chamber to stabilize and cure.
6. Observed daily and ran microscopic checks as required. Set up computer TLQ matrix and completed lab sheets.

DATA/ANALYSIS:

| No. | Week No. | | | | | | |
|---|---|---|---|---|---|---|---|
| | 0 | 1 | 2 | 3 | 4 | 5 | 6 |
| 1 | 10 | 10 | 8 | 8 | 6 | 6 | 6 |
| 2 | 10 | 10 | 10 | 10 | 9 | 8 | 7 |
| 3 | 10 | 10 | 10 | 10 | 10 | 10 | 9 |
| 4 | 10 | 10 | 6 | 5 | 2 | 0 | 0 |
| 5 | 10 | 10 | 10 | 10 | 9 | 9 | 9 |
| BENCH | 10 | 9 | 4 | 0 | 0 | 0 | 0 |

TLQ condition matrix "0" no longer viable

EXAMPLE XI

SUBJECT:
VLQ TRIAL TEST: CANTALOUPE
SUMMARY:
Ran slurry solute concentration at 300 g/liter. Ran eight samples and two bench checks for a total of 10 samples. Sample endurance and taste check with standard concentration and temperatures.
RESULTS:
Samples 1 and 3 (Bench)—Mold and softening after 10 days-two weeks. Not edible. Other samples—(See Table)
LAB METHOD:
1. Set up Tank 1 to 10 liter capacity. Filled with water and added 5 grams of detergent with ultrasonic cleaning probe set at 1200 cps and bath temperature set at approximately 90° F.
2. Set up Tank 2 to 10 liter capacity. Filled with 300 g/liter slurry solution and maintained slurry temperature at approximately 29° F.
3. Selected and picked 10 cantaloupes at near ripe state. Immediately washed 8 samples for 30 seconds soak time in 90° bath. Used 2 cantaloupes as untreated bench samples.
4. Immersed the samples in the slurry solution at 29° F. for a period of 30 seconds.
5. Removed the samples and placed them in the incubation chamber to stabilize and cure for 48 hours.
6. Placed all of the samples on a shelf and observed daily. Ran microscopic checks as required. Complete computer TLQ matrix and lab sheets.
7. Ran thickness survey and lab analysis on sugar levels.
DATA/ANALYSIS:

| No. | Week No. | | | | | | | | |
|---|---|---|---|---|---|---|---|---|---|
| | 0 | 1 | 2 | 3 | 4 | 5 | 6 | 7 | 8 |
| Bench 1 | 10 | 0 | 0 | 0 | 0 | 0 | 0 | 0 | 0 |
| Bench 2 | 10 | 0 | 0 | 0 | 0 | 0 | 0 | 0 | 0 |
| Sample Batch No. | | | | | | | | | |
| 3 | 10 | 8 | 0 | 0 | 0 | 0 | 0 | | |
| 4 | 10 | 9 | | | 8 | | | | |
| 5 | 10 | 9 | | | | | 8/9 | | |
| 6 | 10 | | | | | 9 | | | 9 |
| 7 | 10 | | | | | 9 | | | 9 |
| 8 | 10 | | | | | 9 | | | 9 |
| 9 | 10 | | | | | | | | 9 |
| 10 | 10 | | | | | | | | 8/9 |

EXAMPLE XII

SUBJECT:
VLQ TRIAL TEST: STRAWBERRIES
SUMMARY:
Ran 3 quarts (approx. 30 pieces of fruit) concentration 300 g/liter. 10 pieces used as bench "0". Set up groups of four bunches—7-8 pieces/bunch. Sample endurance and taste check with standard 300 g/liter concentration and temperature. Fruit seems to have more sugar content than "0".
RESULTS:
Bench lasted approx. eight days. Slurry group running 3-4 weeks. Must repeat with better extract method.
LAB METHOD:
1. Set up Tank 1 to 10 liter capacity. Filled with water and added 5 grams of detergent with ultrasonic cleaning probe set at 1200 cps and bath temperature at approximately 90° F.
2. Set up Tank 2 to 10 liter capacity. Filled with 300 g/liter slurry solution and maintained slurry temperature at approximately 29° F.
3. Selected and picked several quarts of strawberries of similar size and ripeness. Immediately washed samples for 30 seconds. Restricted one group unwashed and untreated as bench samples.
4. Immersed 4 sample groups in the slurry at 29° F. for a period of 30 seconds.
5. Removed the samples and packed them in the incubation chamber to stabilize and cure for 48 hours.
6. Placed all samples on shelf and observed daily. Ran microscopic checks as required. Completed computer TLQ matrix and lab sheets.
DATA/ANALYSIS:

| No. | Day No. | | | | | | | |
|---|---|---|---|---|---|---|---|---|
| | 0 | 4 | 8 | 12 | 16 | 20 | 24 | 28 | 32 |
| Sample Batch No. | | | | | | | | |
| 1 | 10 | | 8 | | 6 | | | | |
| 2 | 10 | | | 8 | | | 8 | | 8 |
| 3 | 10 | | 8 | | 7 | | 6 | | |
| 4 | 10 | | | | 9 | | 8 | | 5 |
| Bench | 10 | 4 | 2 | 0 | | | | | |

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:
1. A method of extending the shelf life of produce comprising the steps of:
subjecting the produce to a snap freeze medium for snap freezing the produce such that the produce is coated with a layer of the snap-freeze medium, wherein the step of subjecting the produce to a snap freeze medium includes maintaining the produce in the medium for a period of time which is effective to prevent the produce from freezing;
maintaining the snap freeze medium at a temperature below or substantially at the freezing point of water; and
transferring the produce from the snap freeze medium.
2. The method according to claim 1 wherein the snap freeze medium comprises a slurry of non-artificial by-products.
3. The method according to claim 2 wherein the step of snap freezing the produce includes snap freezing the produce in the slurry at a temperature within the range of approximately 27° F. to approximately 32° F. for a time within the range of approximately 10 seconds to approximately 30 seconds.

4. The method according to claim 2 wherein the slurry further includes an additive selected from the group consisting of sugars, organic fruit acids and acetic acid or any combination thereof.

5. The method according to claim 2 wherein the step of snap freezing the produce in the slurry includes snap freezing the produce in a slurry having byproducts of the produce being processed or byproducts of a similar species of the produce being processed.

6. The method according to claim 1 further comprising the step of immersing the produce in a preconditioning bath for a predetermined period of time in order to wash the produce.

7. The method according to claim 6 wherein the step of immersing the produce in the preconditioning bath includes maintaining the preconditioning bath at a substantially constant elevated temperature above ambient temperature and further includes vibrating the produce in the preconditioning bath at a frequency within the range of sub-sonic through ultrasonic frequencies.

8. The method according to claim 7 wherein the steps of maintaining the preconditioning bath at a constant temperature and vibrating the produce in the preconditioning bath includes maintaining the preconditioning bath at approximately 90° F. and vibrating the wash bath at an ultrasonic frequency within the range of about 20 KHz to about 2000 KHz, wherein the produce is washed for a time within the range of about 5 seconds to about 30 seconds.

9. The method according to claim 2 wherein the step of transferring the produce includes transferring the produce from the snap freeze slurry to a drying system for drying and crystallizing a film of the slurry on the outer surface of the produce.

10. The method according to claim 9 wherein the step of transferring the produce to the drying system includes storing the produce for a time sufficient for drying a film of the slurry on the produce at a substantially constant temperature between about 60° F. to about 70° F.

11. The method according to claim 2 further comprising the step of immersing the produce in a preconditioning bath for a predetermined period of time in order to wash the produce, and wherein the step of transferring the produce includes transferring the produce from the snap freeze slurry to a drying system for drying and crystallizing a film of the slurry on the outer surface of the produce.

12. The method according to claim 2 wherein the produce is tomatoes and the non-artificial byproducts includes byproducts of tomatoes.

13. A method of extending the shelf life of produce comprising the steps of:
introducing the produce into a preconditioning bath for a predetermined period of time in order to wash the produce;
maintaining the preconditioning bath at an elevated temperature above ambient temperature;
vibrating the produce in the preconditioning bath at a predetermined frequency;
immersing the produce in a conditioning bath below the temperature of the preconditioning bath in order to cool the produce, wherein immersing the produce in the conditioning bath includes cooling the produce in a slurry including non-artificial byproducts for a predetermined length of time which is effective to prevent the produce from freezing and to provide a coating of the slurry on the produce; and
transferring the produce from the preconditioning bath to subsequent produce processing steps.

14. The method according to claim 13 wherein the step of immersing the produce in the slurry includes immersing the produce in a slurry including a byproduct of the produce being processed and predetermined concentrations of sugars and acids.

15. The method according to claim 13 wherein the step of immersing the produce in the slurry includes maintaining the slurry at a temperature within the range of approximately 27° F. to approximately 32° F. and keeping the produce in the slurry for a time within the range of approximately 10 seconds to approximately 30 seconds.

16. The method according to claim 13 wherein the step of transferring the produce to subsequent processing steps includes immersing the produce in a snap freeze tank holding a natural slurry including non-artificial byproducts in order to snap freeze the produce and then introducing the produce to a drying system for a predetermined period of time for drying and crystallizing the slurry on the produce.

17. The method according to claim 16 wherein the step of introducing the produce to a drying chamber includes maintaining the produce in the drying system for a time sufficient to substantially dry a film of the slurry on the produce at a substantially constant temperature within the range of about 60° to about 70° F.

18. The method according to claim 13 wherein the step of vibrating the produce includes vibrating the produce at ultrasonic frequencies within the range of about 20 KHz to about 2000 KHz.

19. The method according to claim 13 wherein the step of vibrating the produce includes vibrating the produce at subsonic frequencies.

20. A method of extending the shelf life of produce comprising the steps of:
admitting the produce to a wash bath for washing the produce shortly after the produce has been harvested, and further maintaining the wash bath at an elevated temperature above room temperature and vibrating the wash bath at a predetermined frequency;
transferring the produce from the wash bath to a snap freeze slurry including non-artificial byproducts being maintained at a temperature below or substantially at the freezing point of water in order to snap freeze the produce for a predetermined period of time, wherein the produce is maintained in the slurry for a period of time which is effective to prevent the produce from freezing and to provide a coating of the slurry on the produce; and
transferring the produce from the snap freeze slurry to a storage chamber for storing the produce for a predetermined period of time to dry and allow crystallization of the slurry material on the outer surface of the produce.

21. The method according to claim 20 wherein the step of admitting the produce to the wash bath includes maintaining the wash bath at a temperature of approximately 90° F. and vibrating the wash bath at a frequency within the range of about 20 to about 2000 KHz, and maintaining the produce in the wash bath approximately for a time within the range of about 5 seconds to about 30 seconds.

22. The method according to claim 20 wherein the step of transferring the produce to a snap freeze slurry includes introducing the produce to a slurry containing a byproduct of the produce or a byproduct of a related species of the produce, sugars and fruit and/or acetic acids being maintained at a temperature of approximately 28° F. for approximately 10 seconds.

23. The method according to claim 20 wherein the step of transferring the produce to a storage chamber includes maintaining the produce in the storage chamber for a time sufficient to substantially dry a film of the slurry on the produce at a substantially constant temperature within the range of about 60° F. to about 70° F.

24. The method according to claim 13 wherein the step of maintaining the preconditioning bath at an elevated temperature includes maintaining the preconditioning bath at approximately 90° F.

* * * * *

UNITED STATES PATENT AND TRADEMARK OFFICE
CERTIFICATE OF CORRECTION

PATENT NO. : 5,229,152

DATED : July 20, 1993

INVENTOR(S) : Charles Meldrum

It is certified that error appears in the above-indentified patent and that said Letters Patent is hereby corrected as shown below:

Column 16, line 21, delete "natural".

Signed and Sealed this

Sixteenth Day of May, 1995

Attest:

BRUCE LEHMAN

Attesting Officer

Commissioner of Patents and Trademarks